United States Patent
Park et al.

(10) Patent No.: US 8,475,312 B2
(45) Date of Patent: *Jul. 2, 2013

(54) TRANSMISSION FOR HYBRID ELECTRIC VEHICLE

(75) Inventors: Jongsool Park, Hwaseong-si (KR); Changwook Lee, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 40 days.

This patent is subject to a terminal disclaimer.

(21) Appl. No.: 13/161,858

(22) Filed: Jun. 16, 2011

(65) Prior Publication Data

US 2011/0312464 A1    Dec. 22, 2011

(30) Foreign Application Priority Data

Jun. 18, 2010    (KR) .................. 10-2010-0058120

(51) Int. Cl.
*F16H 3/72*    (2006.01)

(52) U.S. Cl.
USPC ............................ 475/5; 475/282; 475/276

(58) Field of Classification Search
USPC ............... 475/5, 276, 282; 903/911; 180/65.7
See application file for complete search history.

(56) References Cited

U.S. PATENT DOCUMENTS

| | | | |
|---|---|---|---|
| 7,101,298 B2 | 9/2006 | Sowul et al. | |
| 7,217,221 B2 | 5/2007 | Sah et al. | |
| 7,235,029 B2 | 6/2007 | Klemen et al. | |
| 7,264,071 B2 | 9/2007 | Schmidt et al. | |
| 7,306,534 B2 * | 12/2007 | Bucknor et al. | 475/5 |
| 7,367,911 B2 | 5/2008 | Raghavan et al. | |
| 7,395,837 B2 | 7/2008 | Foster et al. | |
| 7,559,864 B2 | 7/2009 | Maeda et al. | |
| 7,597,648 B2 | 10/2009 | Conlon et al. | |
| 7,670,242 B2 | 3/2010 | Bucknor et al. | |
| 7,695,387 B2 | 4/2010 | Oba | |
| 2006/0148604 A1 * | 7/2006 | Raghavan et al. | 475/5 |
| 2007/0049440 A1 * | 3/2007 | Raghavan et al. | 475/5 |
| 2007/0129203 A1 * | 6/2007 | Raghavan et al. | 475/275 |
| 2008/0081722 A1 * | 4/2008 | Raghavan et al. | 475/5 |
| 2008/0318721 A1 | 12/2008 | Oba et al. | |
| 2009/0275437 A1 * | 11/2009 | Kersting | 475/5 |
| 2009/0312128 A1 * | 12/2009 | Kim et al. | 475/5 |
| 2011/0300982 A1 * | 12/2011 | Park et al. | 475/5 |
| 2011/0312461 A1 * | 12/2011 | Park | 475/5 |
| 2011/0312462 A1 * | 12/2011 | Park | 475/5 |
| 2011/0312463 A1 * | 12/2011 | Park | 475/5 |

FOREIGN PATENT DOCUMENTS

| | | |
|---|---|---|
| JP | 2004-284550 A | 10/2004 |
| JP | 2006-168480 A | 6/2006 |
| JP | 2006-258140 A | 9/2006 |
| JP | 2006-341647 A | 12/2006 |

(Continued)

*Primary Examiner* — David D Le
*Assistant Examiner* — Lillian Nguyen
(74) *Attorney, Agent, or Firm* — Morgan, Lewis & Bockius LLP (57) ABSTRACT

A transmission for a hybrid electric vehicle may include an input element where rotation power may be inputted and an output element from which the rotation power may be outputted, a first motor generator and a second motor generator, a first planetary gear set where the input element, the output element, and the first motor generator may be connected, a second planetary gear set that may be a multiple planetary gear set where the output element and the second motor generator may be connected and that includes at least four or more rotary elements, and a first clutch and a second clutch.

16 Claims, 8 Drawing Sheets

FOREIGN PATENT DOCUMENTS

| | | |
|---|---|---|
| JP | 2007-296881 A | 11/2007 |
| JP | 2008-56236 A | 3/2008 |
| JP | 2008-68705 A | 3/2008 |
| JP | 2008-114812 A | 5/2008 |
| JP | 2008-207657 A | 9/2008 |
| JP | 2008-286294 A | 11/2008 |
| JP | 2008-308012 A | 12/2008 |
| JP | 2009-190694 A | 8/2009 |
| JP | 2009-248825 A | 10/2009 |
| JP | 2010-6139 A | 1/2010 |
| KR | 10-2007-0082399 A | 8/2007 |
| KR | 10-2008-0011672 A | 2/2008 |
| KR | 10-0893438 B1 | 4/2009 |
| KR | 10-2009-0113653 A | 11/2009 |
| KR | 10-0940855 B1 | 2/2010 |
| KR | 10-0969084 B1 | 7/2010 |
| KR | 10-0996132 B1 | 11/2010 |
| KR | 10-2011-0006909 A | 1/2011 |

* cited by examiner

|  | CL1 | CL2 | CL3 | REFERENCE |
|---|---|---|---|---|
| EV1 | ● |  |  | Engine Off |
| EVT-1 | ● |  |  | Input Split Mode |
| EVT-2 |  | ● |  | Compound Mode |
| FG1 |  | ● | ● | (0.642) |
| FG2 | ● | ● |  | (1.642) |
| FG3 | ● |  |  | CL4(2.8) |
| FG4 |  | ● |  | CL4(1.0) |

US 8,475,312 B2

TRANSMISSION FOR HYBRID ELECTRIC VEHICLE

CROSS-REFERENCE TO RELATED APPLICATIONS

The present application claims priority to Korean Patent Application Number 10-2010-0058120 filed Jun. 18, 2010, the entire contents of which application is incorporated herein for all purposes by this reference.

BACKGROUND OF THE INVENTION

1. Field of the Invention

The present invention relates to a transmission for a hybrid electric vehicle, and more particularly, to an electrically variable transmission (EVT) that implements a continuous transmission gear ratio, using one or more planetary gear sets and motors.

2. Description of Related Art

Figure 1:
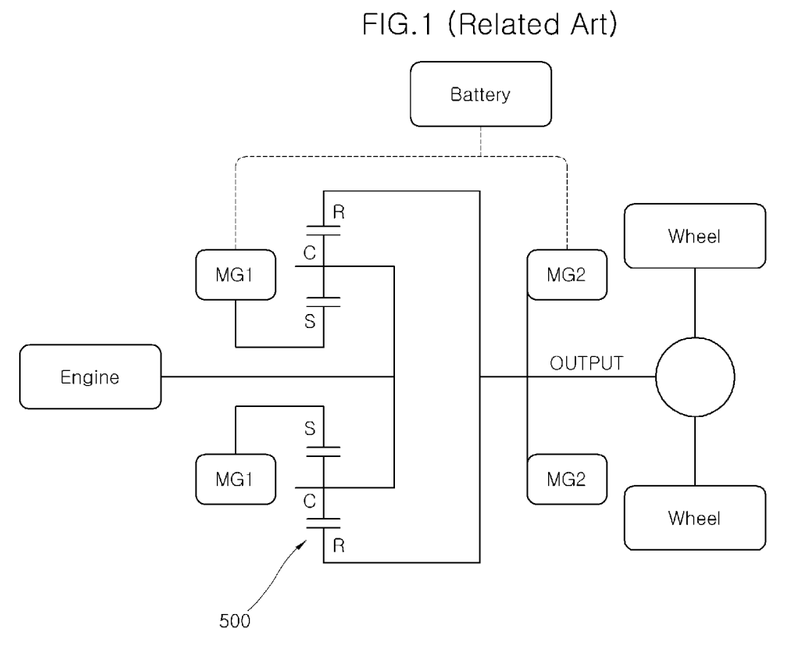
FIG. 1 is a diagram illustrating the configuration of a single mode type of EVT according to the related art.

The EVTs in the related art can be classified into a single mode type and a multimode type. The single mode type, as shown in FIG. 1, typically uses a planetary gear set 500 that has a configuration in which input from an engine is supplied to a carrier C and output is achieved through a ring gear R, and a first motor generator MG1 is connected to a sun gear S and a second motor generator MG2 is connected to ring gear R.

Figure 2:
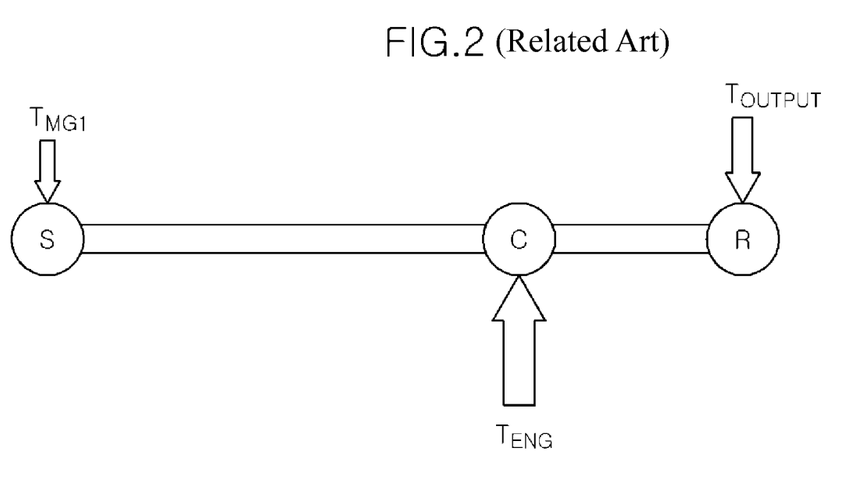
FIG. 2 is a lever diagram illustrating a torque relationship of the EVT shown in FIG. 1.

The relationship of torque in the EVT can be briefly shown, as shown in FIG. 2, that is, torque from first motor generator MG1 and the output shaft is applied from both sides, with respect to torque supplied from the engine to carrier C, such that they keep balance.

Therefore, first motor generator MG1 should keep supplying appropriate reaction force to transmit the torque of the engine well to the output shaft, such that the torque of the output shaft is necessarily smaller than the torque of the engine. Further, the amount of power transmitted from the engine along an electric path which is made through first motor generator MG1 and second motor generator MG2 considerably increase in an acceleration section of the vehicle, such that efficiency decreases and motor generators having large capacity are required.

Although the multimode types of EVTs have been proposed to overcome the defects described above, most of the EVTs are provided with an ENGINE ONLY mode for starting a vehicle due to various limits for the characteristics of batteries and motor generators.

That is, in wide open throttle (WOT) start in which a driver rapidly starts a hybrid electric vehicle by maximally pressing down the acceleration pedal, it is difficult to ensure sufficient output shaft torque due to limits in the batteries and motor generators in the multimode types of EVTs of the related art, such that the specific ENGINE ONLY mode is provided for the rapid acceleration start only by the engine, such that the user's request is satisfied.

Further, as described above, in order to overcome the practical limits in the batteries and motor generators, the number of clutches that are provided with various modes including the ENGINE ONLY start mode and used to switch the modes is increased; however, as a plurality of clutches is provided, transmission efficiency of the EVT decreases, and new problems, such as complicity in the control of switching the modes and shock in switching the modes, occur.

Further, the shock due to switching the modes occurs and acceleration response of the vehicle decreases when the modes are frequently switched in the WOT start. In particular, it is impossible to continuously increase the number of revolution of the engine in the WOT start in the multimode type of EVT of the related art and it is required to reduce the number of revolution of the engine at a predetermined level in order to switch the modes, such that control is difficult, transmission shock is easily generated, and the acceleration response decreases.

Figure 3:
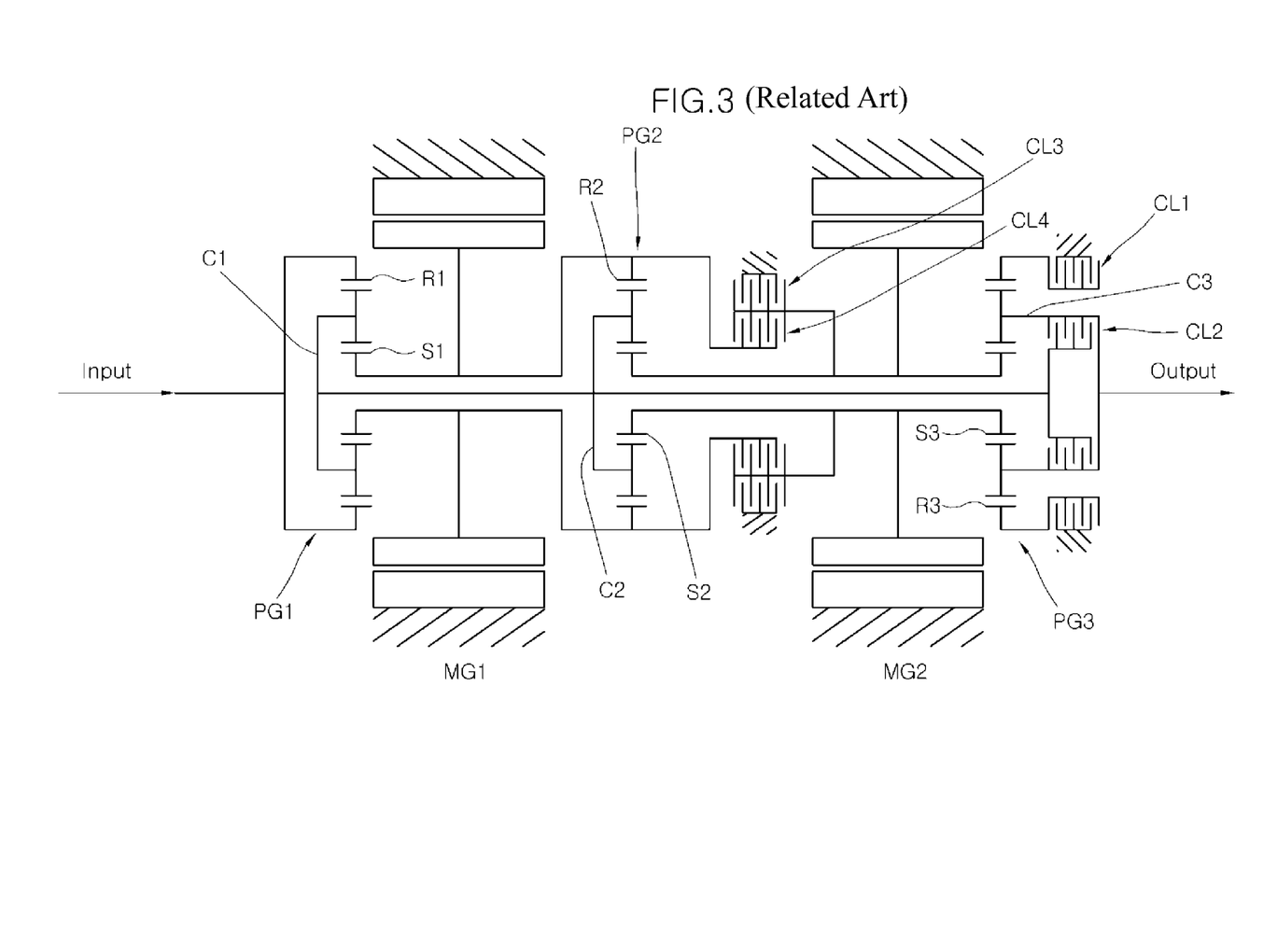
FIG. 3 is a diagram illustrating the configuration of a 2-mode EVT according to the related art.
Figure 4:
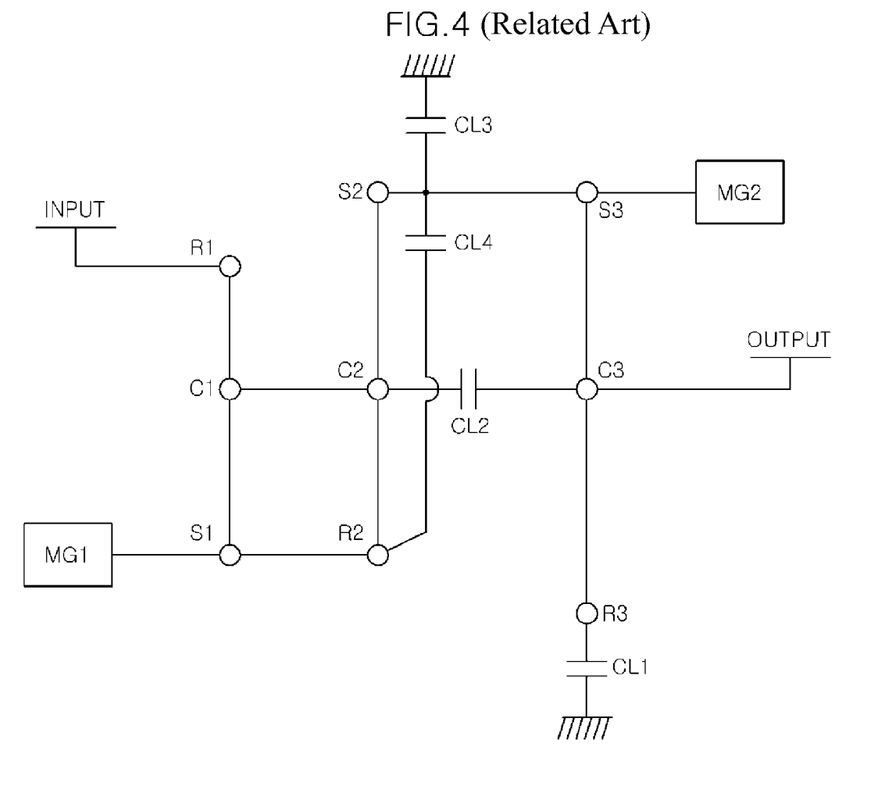
FIG. 4 is a lever diagram illustrating the EVT shown in FIG. 3.

For example, the EVT shown in FIG. 3 is a 2-mode EVT having a fixed gear ratio and can be illustrated by the lever diagram of FIG. 4. In the EVT, a vehicle is started at the first stage with a fixed gear ratio which is implemented by engaging only a firsts clutch CL1 with a fourth clutch CL4 in the WOT start and a first planetary gear set PG1 and a second planetary gear set PG2 become integral by the engagement of fourth clutch CL4 and rotate with the same number of revolution as the engine connected to an input shaft. Further, a third ring gear R3 of a third planetary gear set PG3 is fixed by first clutch CL1, such that the power of the engine that is inputted to a third sun gear S3 of third planetary gear set PG3 is reduced and transmitted the an output shaft through a third carrier C3.

As the vehicle speed increases, the engine is supposed to operate close to the maximum power point such that the maximum acceleration force is acquired, but as the vehicle speed increases, the operation point of the engine exceeds the maximum number of revolution.

In this state, the power of the engine is supposed to directly supplied from second carrier C2 to third carrier C3 by engaging a second clutch CL2, but in this state, there is necessarily a large difference between the rotation speeds of second carrier C2 and third carrier C3, such that it is required to synchronize the rotation speeds of second carrier C2 and third carrier C3 by reducing the speed of the engine. As a result, it becomes worse to control the EVT and transmission shock is likely to be generated, and the acceleration response decreases with the decrease in rotation speed of the engine.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a transmission for a hybrid electric vehicle that can more effectively transmit the torque from an engine to an output shaft, provide sufficient power performance in WOT start, achieve excellent controllability without generating transmission shock by allowing modes to be naturally and smoothly switched, and ensure excellent acceleration response.

In an aspect, the present invention provides a transmission for a hybrid electric vehicle, including an input element where rotation power may be inputted and an output element from which the rotation power may be outputted, a first motor generator and a second motor generator, a first planetary gear set where the input element, the output element, and the first motor generator may be connected, a second planetary gear set that may be a multiple planetary gear set where the output element and the second motor generator may be connected and that may include at least four or more rotary elements, and a first clutch and a second clutch, in which a first rotary element of the first planetary gear set and a first rotary element of the second planetary gear set may be kept connected with the output element, a second rotary element and a third rotary element of the first planetary gear set may be connected with the input element and the first motor generator, respectively, a second rotary element of the second planetary gear set may be connected with the second motor generator, a third rotary element of the second planetary gear set may be switched to be rotatable by the first clutch, and the third rotary element of the first planetary gear set and a fourth rotary element of the second planetary gear set may be switched to be selectively connected by the second clutch.

In another aspect, the present invention provides a transmission for a hybrid electric vehicle, including a first planetary gear set having three rotary elements connected with an input element, an output element, and a first motor generator, respectively, a second planetary gear set including at least four or more rotary elements having a rotary element connected to the output element, a rotary element having the same rotation speed as the rotation speed of the rotary element connected to a first motor generator of the first planetary gear set, and a rotary elements connected to the second motor generator, a second clutch connecting/disconnecting the rotary element of the second planetary gear set which may have the same rotation speed as the rotation speed of the rotary element connected to the first motor generator of the first planetary gear set with/from the rotary element connected to the first motor generator of the first planetary gear set, and a first clutch that switches the rotatable state of one rotary element that may not be connected to the output element, the second motor generator, and the second clutch, in the rotary elements of the second planetary gear set.

According to various aspects of the present invention, it may be possible to more effectively transmit the torque from an engine to an output shaft, provide sufficient power performance in WOT start, achieve excellent controllability without generating transmission shock by allowing modes to be naturally and smoothly switched, and improve acceleration response.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 5:
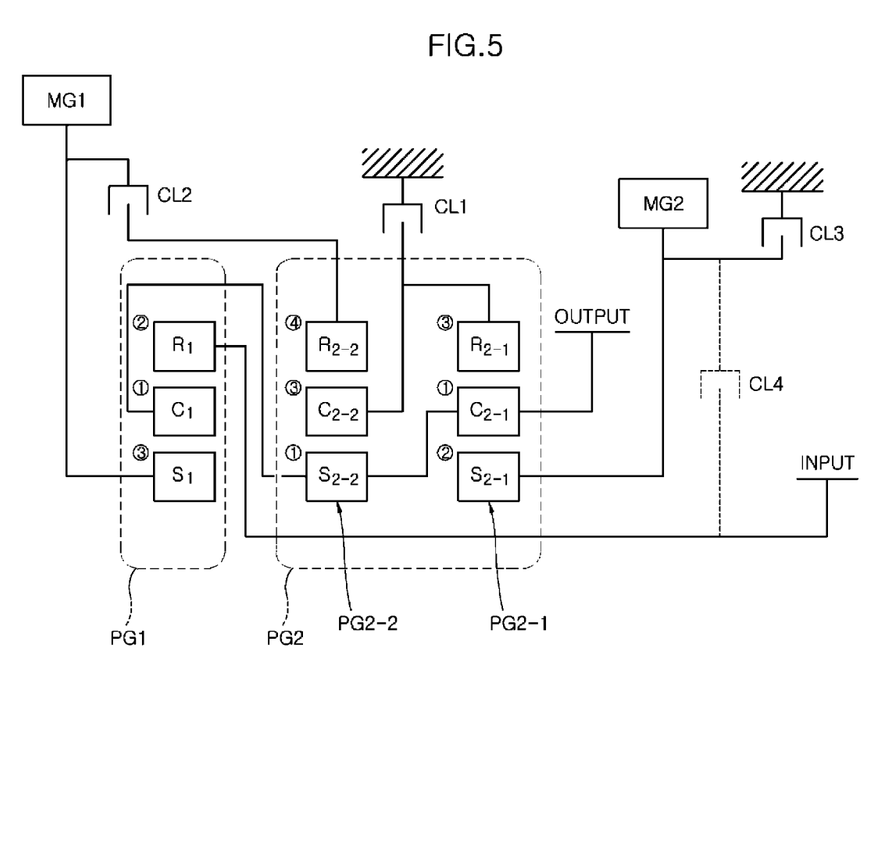
FIG. 5 is a diagram illustrating the configuration of a transmission of a hybrid electric vehicle according to an exemplary embodiment of the present invention.

Referring to FIG. 5, a first exemplary embodiment of the present invention includes: an input element INPUT where rotation power is inputted and an output element OUTPUT from which the rotation power is outputted, a first motor generator MG1 and a second motor generator MG2, a planetary gear set PG1 where input element INPUT, output element OUTPUT, and first motor generator MG1 are connected, a second planetary gear set PG2 that is a multiple planetary gear set where output element OUTPUT and second motor generator MG2 are connected and that includes at least four or more rotary elements, and a first clutch CL1 and a second clutch CL2.

In this configuration, the first rotary element of first planetary gear set PG1 and the first rotary element of second planetary gear set PG2 are kept connected with output element OUPUT, the second rotary element and the third rotary element of first planetary gear set PG1 are connected with input element INPUT and first motor generator MG1, respectively, the second rotary element of second planetary gear set PG2 is connected with second motor generator MG2, the third rotary element of second planetary gear set PG2 is switched to be rotatable by first clutch CL1, and the third rotary element of first planetary gear set PG1 and the fourth rotary element of second planetary gear set PG2 are switched to be selectively connected by second clutch CL2.

Further, in order to make a fixed gear stage when second clutch CL2 operates, a third clutch CL3 is further included to switch one rotary element to be rotatable, which is not connected with output element OUTPUT, first clutch CL1, and second clutch CL2, in the rotary elements of second planetary gear set PG2.

In the exemplary embodiment, one rotary element that is not connected with output element OUTPUT, first clutch CL1, and second clutch CL2, in the rotary elements of second planetary gear set PG2, is the second rotary element of second planetary gear set PG2 where second motor generator MG2 is connected, such that third clutch CL3 is connected to the second rotary element.

Figure 6:
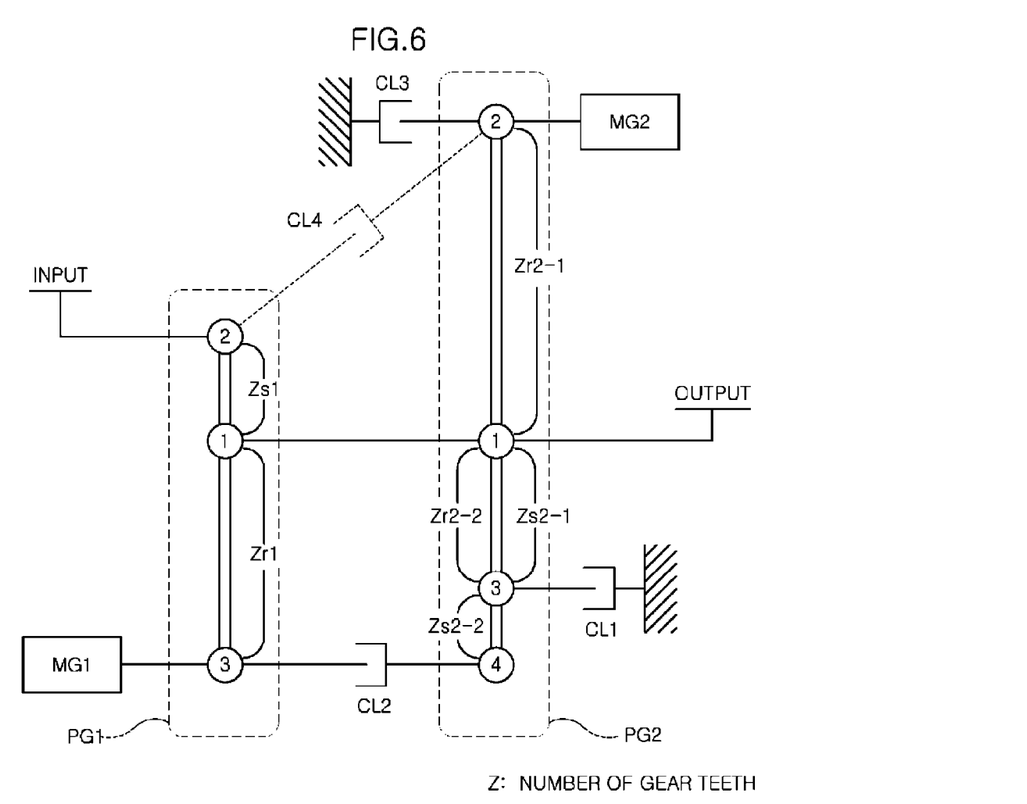
FIG. 6 is a lever diagram illustrating the exemplary embodiments shown in FIG. 5.

Meanwhile, a fourth clutch CL4 may be further included to selectively connect the second rotary element of first planetary gear set PG1 with the second rotary element of second planetary gear set PG2, and fourth clutch CL4 is shown by dotted lines in FIGS. 5 and 6.

In the exemplary embodiment, first planetary gear set PG1 is a single pinion planetary gear set, in which the first rotary element is a carrier C1, the second rotary element is a ring gear R1, and the third rotary element is a sun gear S1. Obviously, the first rotary element of first planetary gear set PG1 may be a ring gear, the second rotary element may be a carrier, and the third rotary element may be a sun gear.

Second planetary gear set PG2 is a multiple planetary gear set composed of a planetary gear set PG2-1 including the first, second, and third rotary elements and a planetary gear set PG2-2 including the first, third, and fourth rotary elements.

In this configuration, the first, second, and third rotary elements of planetary gear set PG2-1 including the first, second, and third rotary elements of second planetary gear set PG2 are a carrier C2-1, a sun gear S2-1, and a ring gear R2-1, respectively, and the first, third, and fourth rotary elements of planetary gear set PG2-2 including the first, third, and fourth rotary elements of second planetary gear set PG2 are a sun gear S2-2, a carrier C2-2, and a ring gear R2-2, respectively.

Obviously, the first, third, and fourth rotary elements of planetary gear set PG2-2 including the first, third, and fourth rotary elements of second planetary gear set PG2 may be a sun gear, a ring gear, and a carrier, respectively.

The configuration of the exemplary embodiment of the present invention described above may be concluded by the lever diagram shown in FIG. 6.

Figure 7:
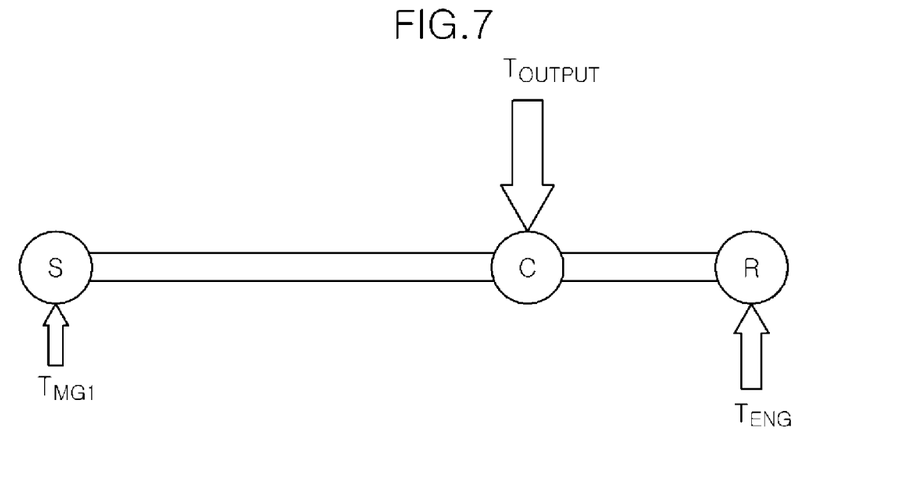
FIG. 7 is a lever diagram briefly illustrating a torque relationship of the EVT shown in FIG. 6.

The arrangement state of torque applied to the lever showing first planetary gear set PG1 may be illustrated again, as shown in FIG. 7.

That is, for the torque exerted in output element OUTPUT, it may be considered that torque from an engine and torque from first motor generator MG1 are exerted at both sides, such that the torque is balanced.

Comparing the state of FIG. 7 with the state of the related art shown in FIG. 2, it can be seen that it is possible to transmit torque larger than the engine torque to output element OUTPUT, and when the path through which the power of the engine reaches output element OUTPUT is divided into a mechanical power path and an electrical power path, it can be seen that it is possible to relatively increase the relative importance of power transmission through the mechanical power path, such that it is possible to transmit high effective mechanical power, thereby achieving more larger acceleration force than the related art in the WOT start and reducing the size of the first motor generator MG1 because the importance of the electrical power can be reduced.

Since, as described, it is possible to achieve larger acceleration force in the EVT of the present invention than the fixed gear ratio mode that is the ENGINE ONLY mode applied to the 2-mode EVT of the related art, it is not required to switch to the ENGINE ONLY mode when starting, such that it is possible to make the configuration of the EVT more simple and decrease the clutches with the decrease of modes, and thus, it is possible to simplify the configuration and improve power transmission efficiency.

Figure 8:
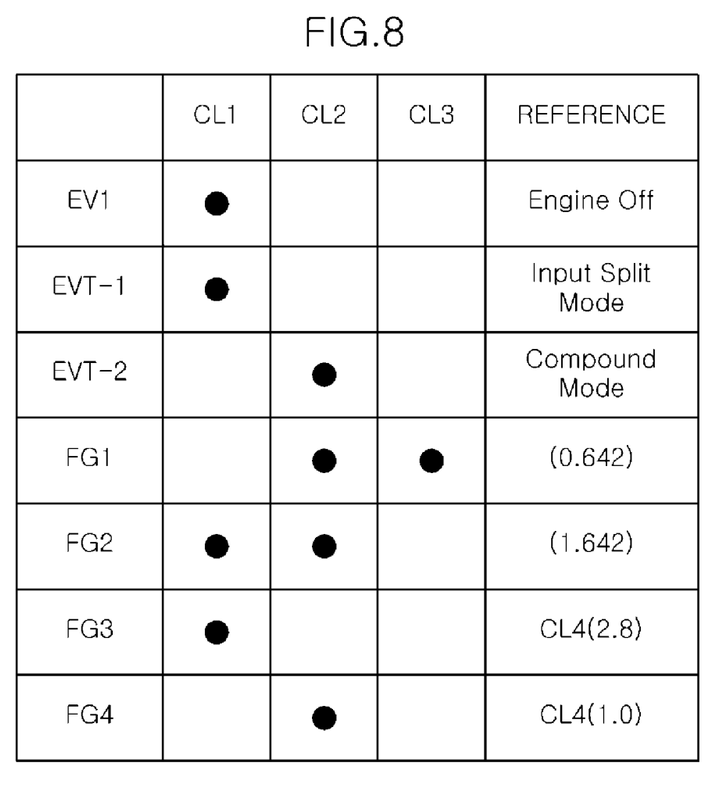
FIG. 8 is an operation mode table of the exemplary embodiment shown in FIG. 5.

The operation in the WOT start of the EVT of the present invention is described with reference to the lever diagram of the EVT of the present invention shown in FIG. 6 and the operation mode table shown in FIG. 8.

The EVT of the present invention uses not the fixed gear ratio mode that is the ENGINE ONLY MODE, but an EVT-1 and EVT-2 modes, in the WOT start.

That is, driving is implemented in the EVT-1 mode in the early stage of the WOT start, in which only first clutch CL1 is engaged, the engine power is supplied to the second element of first planetary gear set PG1 through input element INPUT, an input division mode is implemented by operating second motor generator MG2 by using electricity generated by first motor generator MG1, and power is outputted to output element OUTPUT through the first element of first planetary gear set PG1 and the first element of second planetary gear set PG2.

In this state, since first clutch CL1 is engaged, as the vehicle speed increases, the rotation speed of second motor generator MG2 considerably increases in comparison to the rotation speed of the rotation force supplied to output element OUTPUT in accordance with the gear ratio of second planetary gear set PG2 and the number or revolution of second motor generator MG2 becomes too high when the engine operates close to the maximum power point, such that loss due to high-speed rotation starts to rapidly increase.

In the EVT of the present invention, it is switched to the EVT-2 mode that is a multiple division mode before the loss due to high-speed rotation of second motor generator MG2 rapidly increases, which is implemented simply by engaging second clutch CL2 and disengaging first clutch CL1.

That is, in the EVT of the present invention, it is possible to engage second clutch CL2 disposed between the third rotary element of first planetary gear set PG 1 and the fourth rotary element of second planetary gear set PG2 without a specific synchronizing process, when the number of revolution of the fourth rotary element of second planetary gear set PG2 becomes the same as the number of revolution of the third rotary element of first planetary gear set PG1, such that it is possible to very simply control switching the modes and smoothly switch the modes without transmission shock, and accordingly, the acceleration response is improved.

Further, the torque directions of first motor generator MG1 and second motor generator MG2 are kept before and after the mode is switched, as described above, such that the control become easier.

The engine keeps operating at the maximum power point by the EVT-2 mode implemented as described above and the rotation speed of second motor generator MG2 gradually decreases with the increase in vehicle speed, such that it operates only within the limited operation range (for example, 12000 RPM) of the motor.

Further, in the EVT of the present invention, two fixed gear ratio modes can be additionally implemented without fourth clutch CL4 and two additional fixed gear ratio modes can be further implemented when fourth clutch CL4 is added, such that total four fixed gear ratio modes can be achieved.

That is, when first planetary gear set PG1 and second planetary gear set PG2 are implemented in a multiple planetary gear that can be shown by one lever by engaging second clutch CL2 and the second rotary element of second planetary gear set PG2 is fixed by engaging third clutch CL3, a first fixed gear ratio mode FG1 in which the rotation speed of the output element increases with respect to the rotation speed of the engine is implemented.

Further, when first clutch CL1 is engaged instead of third clutch CL3, with second clutch CL2 engaged, the third rotary element of second planetary gear set PG2 is fixed, such that a second fixed gear ratio mode FG2 in which the rotation speed of the output element decreases with respect to the rotation speed of the engine is implemented.

Further, when fourth clutch CL4 is engaged, with only first clutch CL1 engaged, a third fixed gear ratio mode FG3 in which output further decreased than second fixed gear ratio mode FG2 is outputted to output element OUTPUT is implemented, and in a fourth fixed gear ratio mode FG4 in which only second clutch CL2 and fourth clutch CL4 are engaged, all of the rotary elements of first planetary gear set PG1 and second planetary gear set PG2 are integrated by second clutch CL2 and fourth clutch CL4, such that the engine power is outputted at a transmission ratio of 1:1 to output element OUTPUT.

The several fixed gear ratio modes can significantly contribute to improving fuel efficiency of a vehicle by allowing the vehicle to travel without electric load. In particular, in first fixed gear ratio mode FG1 that is implemented by engaging second clutch CL2 and third clutch CL3, it is possible to considerably contribute to improving the fuel efficiency when the vehicle travels at high speed by providing an overdrive transmission ratio.

Meanwhile, the exemplary embodiment of the present invention shown in FIG. 5 can be described as the followings. The present invention includes first planetary gear set PG1 including three rotary elements connected with input element INPUT, output element OUTPUT, and first motor generator MG1, respectively, second planetary gear set PG2 including at least four or more rotary elements having a rotary element connected to output element OUTPUT, a rotary element having the same rotation speed as the rotation speed of the rotary element connected to first motor generator MG1 of first planetary gear set PG1, and a rotary element connected to second motor generator MG2, second clutch CL2 connecting/disconnecting the rotary element of second planetary gear set PG2 which has the same rotation speed as the rotation speed of the rotary element connected to first motor generator MG1 of first planetary gear set PG1 with/from the rotary element connected to first motor generator MG1 of first planetary gear set PG1, and first clutch CL1 that can switch the rotatable state of one rotary element that is not connected to output element OUTPUT, second motor generator MG2, and second clutch CL2, in the rotary elements of second planetary gear set PG2.

In this configuration, it is possible to further implement a fixed gear ratio mode by further providing a third clutch CL3 to switch the rotatable state of the rotary element of second planetary gear set PG2 which is connected with second motor generator MG2.

It is possible to further implement two fixed gear ratio modes, other than the fixed gear ratio mode described above, by further providing fourth clutch CL4 to connect/disconnect the rotary element of first planetary gear set PG1 which is connected to input element INPUT and the rotary element of second planetary gear set PG2 which is connected to second motor generator MG2.

First planetary gear set PG1 is a single pinion gear set, the rotary element connected to input element INPUT of first planetary gear set PG1 is ring gear R1, the rotary element connected to output element OUTPUT of first planetary gear set PG1 is carrier C1, and the rotary element connected to first motor generator MG1 of first planetary gear set PG1 is sun gear S1.

Second planetary gear set PG2 includes two single pinion planetary gear sets including two pairs of rotary elements that are kept connected, a pair of the two pairs of rotary elements that are kept connected is connected to output element OUTPUT, the other pair of the two pairs of rotary elements that are kept connected is connected to first clutch CL1, and the other rotary elements that are not included in the pairs are connected to second motor generator MG2 and second clutch CL2, respectively.

In this configuration, in the two pairs of rotary elements second planetary gear PG2 that are kept connected of second planetary gear set PG2, ring gear R2-1 of planetary gear set PG2-1 is connected to carrier C2-2 of planetary gear set PG2-2 and carrier C2-1 of planetary gear set PG2-1 is connected to sun gear S2-2 of planetary gear set PG2-2.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission for a hybrid electric vehicle, comprising:
    an input element where rotation power is inputted and an output element from which the rotation power is outputted;
    a first motor generator and a second motor generator;
    a first planetary gear set where the input element, the output element, and the first motor generator are connected;
    a second planetary gear set that is a multiple planetary gear set where the output element and the second motor generator are connected and that includes at least four or more rotary elements;
    a first clutch and a second clutch;
    a third clutch that switches one rotary element to be rotatable, which is not connected with the output element, the first clutch, and the second clutch, in rotary elements of the second planetary gear set, in order to make a fixed gear stage when the second clutch operates,
    wherein a first rotary element of the first planetary gear set and a first rotary element of the second planetary gear set are kept connected with the output element,
    a second rotary element and a third rotary element of the first planetary gear set are connected with the input element and the first motor generator, respectively,
    a second rotary element of the second planetary gear set is connected with the second motor generator,
    a third rotary element of the second planetary gear set is switched to be rotatable by the first clutch, and
    the third rotary element of the first planetary gear set and a fourth rotary element of the second planetary gear set are switched to be selectively connected by the second clutch.

2. The transmission for the hybrid electric vehicle according to claim 1, further comprising a fourth clutch that selectively connects the second rotary element of the first planetary gear set with the second rotary element of the second planetary gear set.

3. The transmission for the hybrid electric vehicle according to claim 1, wherein the first rotary element of the first planetary gear set is a carrier.

4. The transmission for the hybrid electric vehicle according to claim 1, wherein the first rotary element is a carrier, the second rotary element is a ring gear, and the third rotary element is a sun gear, in the first planetary gear set.

5. The transmission for the hybrid electric vehicle according to claim 1, wherein the first rotary element of the first planetary gear set is a ring gear.

6. The transmission for the hybrid electric vehicle according to claim 1, wherein the first rotary element is a ring gear, the second rotary element is a carrier, and the third rotary element is a sun gear, in the first planetary gear set.

7. The transmission for the hybrid electric vehicle according to claim 1, wherein the second planetary gear set is a multiple planetary gear set having a planetary gear set including the first, the second, and the third rotary elements and a planetary gear set including the first, the third, and the fourth rotary elements.

8. The transmission for the hybrid electric vehicle according to claim 7, wherein the first, second, and third rotary elements of the planetary gear set including the first, second, and third rotary elements of the second planetary gear set are a carrier, a sun gear, and a ring gear, respectively.

9. The transmission for the hybrid electric vehicle according to claim 7, wherein the first, third, and fourth rotary elements of the planetary gear set including the first, third, and fourth rotary elements of the second planetary gear set are a sun gear, a carrier, and a ring gear, respectively.

10. The transmission for the hybrid electric vehicle according to claim 7, wherein the first, third, and fourth rotary elements of the planetary gear set including the first, third, and fourth rotary elements of the second planetary gear set are a sun gear, a ring gear, and a carrier, respectively.

11. The transmission for the hybrid electric vehicle according to claim 1, further comprising the third clutch that switches the second rotary element connected with the second motor generator of the second planetary gear set to be rotatable in order to make a fixed gear ratio stage when the second clutch operates.

12. A transmission for a hybrid electric vehicle, comprising:
a first planetary gear set including three rotary elements connected with an input element, an output element, and a first motor generator, respectively;
a second planetary gear set including at least four or more rotary elements having a rotary element connected to the output element, a rotary element having a same rotation speed as the rotation speed of the rotary element connected to the first motor generator of the first planetary gear set, and a rotary element connected to a second motor generator;
a second clutch connecting/disconnecting the rotary element of the second planetary gear set which has the same rotation speed as the rotation speed of the rotary element connected to the first motor generator of the first planetary gear set with/from the rotary element connected to the first motor generator of the first planetary gear set;
a first clutch that switches the rotatable state of one rotary element that is not connected to the output element, the second motor generator, and the second clutch, in the rotary elements of the second planetary gear set; and
a third clutch that switches the rotary element of the second planetary gear set which is connected with the second motor generator to be rotatable.

13. The transmission for the hybrid electric vehicle according to claim 12, further comprising a fourth clutch that connects/disconnects the rotary element, which is connected with the input element, of the first planetary gear set with/from the rotary element, which is connected with the second motor generator, of the second planetary gear set.

14. The transmission for the hybrid electric vehicle according to claim 12, wherein the first planetary gear set is a single pinion gear set,
the rotary element connected to the input element of the first planetary gear set is a ring gear,
the rotary element connected to the output element of the first planetary gear set is a carrier, and
the rotary element connected to the first motor generator of the first planetary gear set is a sun gear.

15. The transmission for the hybrid electric vehicle according to claim 14, wherein the second planetary gear set includes two single pinion planetary gear sets including two pairs of rotary elements that are kept connected,
a pair of the two pairs of rotary elements that are kept connected is connected to the output element,
and other pair of the two pairs of rotary elements that are kept connected is connected to the first clutch, and
other rotary element that are not included in the pairs are connected to the second motor generator and the second clutch, respectively.

16. The transmission for the hybrid electric vehicle according to claim 15, wherein in the two pairs of rotary elements of the second planetary gear set that are kept connected, a ring gear of one planetary gear set is connected to a carrier of another planetary gear set and a carrier of one planetary gear set is connected to a sun gear of the other planetary gear set.

* * * * *